Patented Oct. 26, 1954

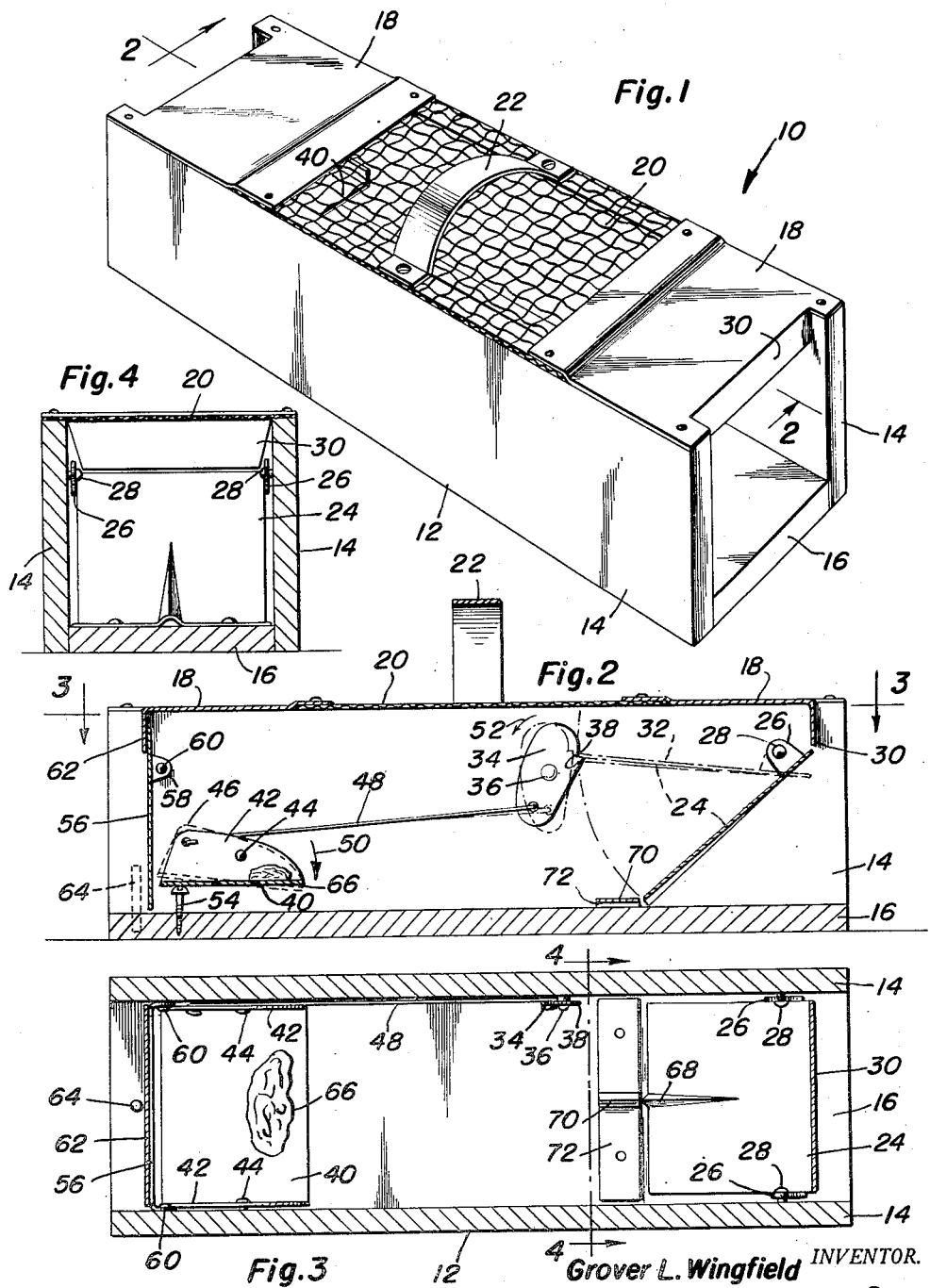

2,692,453

UNITED STATES PATENT OFFICE 2,692,453

ANIMAL TRAP

Grover L. Wingfield, Sandstone, W. Va.

Application November 29, 1951, Serial No. 258,879

2 Claims. (Cl. 43—61)

This invention relates to new and useful improvements and structural refinements in an animal trap, and the principal object of this invention is to provide a trap of the character herein described, which is primarily intended for catching live gophers, or the like.

The advantages of the invention reside in its simplicity of construction, in its efficient and dependable operation and in its adaptability to economical manufacture.

With the above more important objects in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a longitudinal sectional view, taken substantially on the plane of the line 2—2 in Figure 1;

Figure 3 is a horizontal sectional view, taken substantially on the plane of the line 3—3 in Figure 2; and Figure 4 is a transverse sectional view, taken substantially on the plane of the line 4—4 in Figure 3.

Like characters of reference are employed to designate like parts in the specification and throughout the several views.

Referring now to the accompanying drawings in detail, the invention consists of a trap which is designated generally by the reference character 10 and embodies in its construction an elongated housing 12 including a pair of spaced side walls 14, a bottom 16 and a top wall consisting of imperforate end sections 18 and a foraminous intermediate section 20, as is best shown in Figure 1.

It is to be noted that the ends of the housing are open and for purposes of convenient portability, the housing is provided at the top thereof with a carrying handle 22.

An inclined trap door 24, provided at the opposite side edges thereof with suitable ears 26, is pivoted at 28 to the side walls 14 and is disposed in one end portion of the housing, the upper edge of the trap door 24 being disposed adjacent a down-turned flange 30 provided on one of the top wall sections 18, while the lower edge of the trap door is engageable with the bottom 16. The trap door is swingable upwardly to an open position as shown by the dotted lines 32 in Figure 2 and is releasably sustained in this position by an upright catch 34 which is pivoted intermediate its ends at 36 to one of the side walls 14 and is provided with a step 38 above its pivot 36 to supportably engage the lower edge portion of the open trap door.

A trigger plate 40 is disposed adjacent the bottom 16 in the opposite portion of the housing and is provided at the opposite sides thereof with upstanding flanges 42 which are pivoted to the side walls 14 at 44, whereby the trigger plate is depressibly mounted, the depressed position thereof being indicated by the dotted line 46.

A simple link 48 in the form of a push rod operatively connects one of the flanges 42 of the trigger plate with the catch 34 below the pivot 36 of said catch, so that when the trigger plate is depressed in the direction of the arrow 50, the link 48 will exert a direct push against the catch 34 to rotate said catch as indicated at 52, whereby the step 38 is swung from under the trap door and the trap door 24 is released from the catch and is permitted to gravitate to its closed position, as will be clearly understood. The trigger plate 40 is adjustably sustained in its "set" position by a screw 54 provided on the bottom 16.

The end of the housing 12 adjacent the trigger plate 40 is equipped with a swingable closure panel 56 which is provided with ears 58 pivoted to the walls 14 at 60 and it is to be noted that a downturned flange 62 provided on the adjacent top wall section 18 forms an abutment for the closure panel 56 when the latter is in its closed position. A locking pin 64 may be removably positioned in a suitable aperture in the bottom 16 exteriorly of the panel 56, to prevent the latter from opening.

When the invention is placed in use, the panel 56 is opened after removing the pin 64 and, with the trap door 24 engaging the catch 34, bait is placed on the trigger plate 40 as indicated at 66.

Thereupon the panel 56 may be locked in its closed position by the pin 64 and, with the trap door 24 open, an animal may enter the interior of the housing in an effort to gain access to the bait. However, by depressing the inner end of the trigger plate 40, the animal will automatically release the catch 34 from the trap door and the trap door 24 will automatically swing by gravity to its closed position, thus trapping the animal within the housing enclosure. It will be noted that the trigger plate 40 is overbalanced toward "set" position so that when the trap door 24 is swung into its fully open position, the catch 34 is automatically engaged with said door to set the trap. Thus, the catch 34 is completely automatic in operation as regards setting and releasing the door 24.

The presence of the animal in the housing may be observed through the foraminous top wall section 20, and means are provided for preventing the animal from escaping by attempting to lift the trap door 24, these means consisting of the provision of an elongated, struck out portion 68 in the lower edge portion of the door 24, the lower end of which portion is substantially aligned with similar struck out portion 70 intermediate the ends of a transverse guard plate 72 which is secured to the bottom 16 adjacent the trap door. In this manner the guard plate or strap 72 prevents access to the lower edge portion of the trap door so that the latter cannot be lifted upwardly by the trapped animal.

However, it is to be noted that by virtue of the struck out portions 68, 70 in the door 24 and cross bar 72, small animals may force their way from the outside into the trap through the door 24 even though the latter may be in a closed position.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In an animal trap, the combination of an elongated housing including a pair of spaced side walls and a bottom, a gravity actuated trap door provided in one end portion of said housing, a pair of apertured ears provided on opposite side edges of an upper portion of said trap door and pivoted to the respective side walls, an upright catch having a pivot intermediate its ends on one of said side walls adjacent the top of said housing, a step provided on an edge of said catch above said pivot and engageable under the lower edge of said trap door to sustain the latter in an open position, a bait receiving trigger plate disposed in the other end portion of said housing adjacent said bottom, a pair of upturned flanges provided at opposite side edges of said trigger plate and pivoted to the respective side walls for depression of said trigger plate at one side of its pivot, a push rod having one end thereof pivoted to said catch below said pivot, the other end of said push rod being pivoted to one of said flanges, whereby said step may be disengaged from said trap door when the trigger plate is depressed.

2. In an animal trap, a housing having side walls, a bottom and an open entrance end, a gravity-actuated trap door in said housing at said end having a lower edge and being pivoted between said side walls for gravitational swinging into closing position to engage its lower edge with said bottom, said door, when closed, inclining downwardly and inwardly of said housing and being adapted for pushing open by a comparatively large animal, and a transverse horizontal guard plate secured to said bottom inwardly of the lower edge of the door when closed and blocking access by an animal in the trap to said lower edge to prevent the animal from lifting said edge, said guard plate having a struck up portion and said door having a struck up portion at its lower edge registering with the struck up portion in the plate when the door is closed, said struck up portions providing, when the door is closed, a small entrance to the trap through which a very small animal may force its way into the trap.

References Cited in the file of this patent

UNITED STATES PATENTS

| Number | Name | Date |
|---|---|---|
| 844,517 | Haas | Feb. 19, 1907 |
| 1,515,083 | Wilkins | Nov. 11, 1924 |
| 1,554,079 | Frick | Sept. 15, 1925 |
| 1,590,879 | Boyton | June 29, 1926 |
| 1,843,141 | Orth et al. | Feb. 2, 1932 |
| 1,861,478 | Kleffman | June 7, 1932 |
| 1,877,712 | Zelma | Sept. 13, 1932 |
| 1,913,823 | Witte | June 13, 1933 |
| 2,073,373 | Kahn | Mar. 9, 1937 |
| 2,155,006 | Cooper | Apr. 18, 1939 |
| 2,161,789 | Wingfield | June 13, 1939 |